United States Patent [19]

Ogawa et al.

[11] Patent Number: 5,231,557
[45] Date of Patent: Jul. 27, 1993

[54] MAGNETIC DISK APPARATUS HAVING ROTARY TYPE ACTUATOR AND A HEIGHT REDUCING RETURN SPRING

[75] Inventors: Yoshinori Ogawa, Kawasaki; Hisashi Matsumoto, Nagano, both of Japan

[73] Assignee: Fujitsu Limited, Kawasaki, Japan

[21] Appl. No.: 700,427

[22] Filed: May 15, 1991

[30] Foreign Application Priority Data

Sep. 3, 1990 [JP] Japan .................. 2-230547

[51] Int. Cl.⁵ .................. G11B 5/55; G11B 21/08
[52] U.S. Cl. .................. 360/106; 360/105
[58] Field of Search .......... 360/97.01, 98.01, 106, 360/108, 104, 105

[56] References Cited

U.S. PATENT DOCUMENTS

| 4,888,056 | 12/1989 | West | 360/106 |
| 5,018,035 | 5/1991 | Johnson | 360/106 |
| 5,060,100 | 10/1991 | Mihara et al. | 360/106 |
| 5,109,310 | 4/1992 | Ohkjita et al. | 360/105 |
| 5,119,254 | 6/1992 | Brown et al. | 360/106 |

*Primary Examiner*—John H. Wolff
*Attorney, Agent, or Firm*—Staas & Halsey

[57] ABSTRACT

A magnetic disk apparatus includes a magnetic head, a magnetic disk, and a rotary actuator to move the magnetic head onto the magnetic disk. The rotary actuator includes a center shaft fixed to a disk enclosure, a carriage supporting the magnetic head and rotatably mounted to the center shaft, and a coil spring to return the carriage to a CSS zone when there is a breakdown or failure of the power supply of the magnetic disk apparatus. The coil spring is provided in a space formed between the center shaft and the carriage, and thereby can achieve a more compact magnet disk apparatus. Moreover, due to the assembly of the return coil spring around the shaft using a pair of end ring members, contact of the spring with the shaft and carriage is avoided and proper operation of the magnetic heads is ensured.

31 Claims, 7 Drawing Sheets

MAGNETIC DISK APPARATUS HAVING ROTARY TYPE ACTUATOR AND A HEIGHT REDUCING RETURN SPRING

BACKGROUND OF THE INVENTION

1. Field of the Invention

This invention relates to a disk apparatus having a rotary type actuator to move a head onto a disk. More particularly, this invention relates to a magnetic disk apparatus having a rotary type actuator using a return spring for positioning a magnetic head of the actuator at a predetermined position in a rotational direction about a center axis of the actuator.

2. Description of the Related Art

In a disk apparatus, such as a magnetic disk apparatus, a head to read from and/or write data to a disk needs to be positioned at a predetermined zone on a surface of the disk in the event operation of the disk apparatus is disabled, such as disablement due to damage, power failure or some other breakdown of the apparatus power supply. More particularly, in a magnetic disk apparatus, magnetic heads are positioned in a so-called magnetic head landing zone or contact start-stop ("CSS") zone provided on the surface of the magnetic disk. The CSS zone is used as an initial track position when the magnetic head carrier carries out a contact start-stop operation in the magnetic disk apparatus. The CSS zone is usually provided at the most inner or outer circumferential track position of the magnetic disk.

Figure 7:
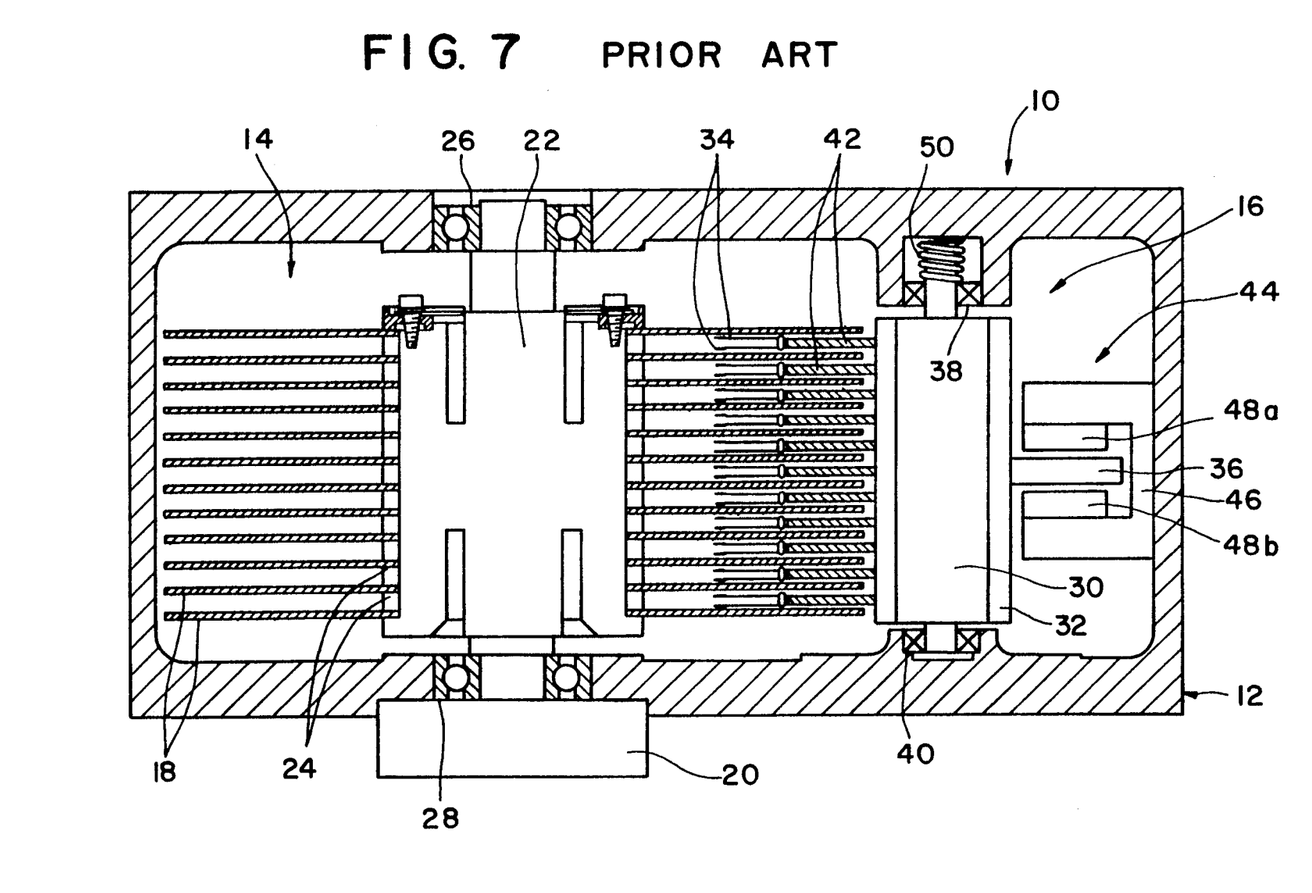
FIG. 7 is a schematic, vertical cross-sectional view of a magnetic disk apparatus having a prior art rotary actuator.

FIG. 7 is a vertical cross-sectional view of a magnetic disk apparatus having a prior art rotary actuator. As shown in FIG. 7, the magnetic disk apparatus 10 comprises a disk housing or enclosure 12, a spindle assembly 14, and a rotary actuator 16.

The spindle assembly 14 comprises a plurality of magnetic disks 18, a spindle motor 20, and a center spindle shaft 22. The magnetic disks 18 are mounted on the spindle shaft 22 through spacers 24 located between the magnetic disks 18. The spindle shaft 22 is mountably supported by the disk enclosure 12. Shaft bearings 26,28 are located at each end of the spindle shaft 22 for rotatably supporting shaft 22. The spindle shaft 22 is operatively driven and rotated by the spindle motor 20.

The rotary actuator 16 comprises a center shaft 30, a carriage 32, a plurality of magnetic heads 34, magnetic head arms 42 and a coil assembly 36. The center shaft 30 is mountably supported by the disk enclosure 12. Shaft bearings 38,40 are located at each end of the center shaft 30 for rotatably supporting the shaft 30. The carriage 32 is provided around and integrally connected to the center shaft 30. The magnetic heads 34 read and/or write data onto corresponding magnetic disks 18. Each of the heads 34 is mounted on a corresponding head arm 42. The head arms 42 are fixed to the carriage 32. Each of the magnetic heads 34 is positioned opposite to a corresponding surface of a magnetic disk 18. The coil assembly 36 is also fixed to the carriage 32 and constitutes part of a magnetic circuit 44 that rotates the carriage 32 with the center shaft 30. The magnetic circuit 44 also has a yoke 46 provided on an inside surface of the disk enclosure 12, and permanent magnets 48a,48b separated by an air space.

A return spring 50, i.e., a coil spring, is provided at an end of the center shaft 30 and in between the bearing 38 and the disk enclosure 12. One end of the coil spring 50 is fixed to the center shaft 30 and the other end of the coil spring 50 is fixed to the disk enclosure 12. Each end of the coil spring 50 is bent, and these bent ends are positioned in respective slits formed on the center shaft 30 and the disk enclosure 12.

As explained above, the coil spring 50 has been conventionally provided at the end of the center shaft 30. Therefore, where the rotary actuator 16 is used in a disk apparatus, such as a magnetic disk apparatus 10, the disk apparatus requires extra space for locating the spring.

SUMMARY OF THE INVENTION

Accordingly, it is a primary object of the present invention to provide an improved rotary type actuator which has a short length in the longitudinal direction of the rotary actuator.

Another object of the present invention is to provide a disk apparatus which is compact in size.

Yet another object of the present invention is to provide a disk apparatus with an easily assembled rotary actuator having an accurately predetermined spring value.

Additional objects and advantages of the present invention will be set forth in the description which follows, and, in part, will be clear from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention as embodied and broadly described herein, there is provided a rotary actuator for moving a read and/or write head onto a disk comprising: a center shaft; a carriage positioned around the shaft, the carriage supporting the read and/or write head; a bearing for rotatably mounting the carriage to the shaft; and a return spring provided in a space formed between the shaft and the carriage to bias the carriage in a rotational direction.

In accordance with the invention and as embodied herein, there is further provided a method for assembling a rotary actuator comprising the steps of providing a shaft, a coil spring, first and second ring members, and a carriage, wherein inside diameters of the coil spring and the first ring member are greater than the diameter of the shaft and an inside diameter of the second ring member is the same as the diameter of the shaft; fixing each end of the coil spring to a respective end of the first and second ring members such that the center axes of the ring members and the coil spring are aligned; inserting the shaft into the assembled coil spring and ring members; fixing the second ring member to the shaft; inserting the shaft into the carriage; and fixing the first ring member to the carriage.

BRIEF DESCRIPTION OF THE DRAWINGS

The accompanying drawings, which are incorporated in and constitute a part of the specification, illustrate embodiments of the invention and, together with the description, serve to explain the principles of the invention. In the drawings, like numerals refer to like parts throughout.

DETAILED DESCRIPTION OF THE PREFERRED EMBODIMENTS

Reference will now be made in detail to the present preferred embodiments of the invention, examples of which are illustrated in the accompanying drawings.

Figure 1:
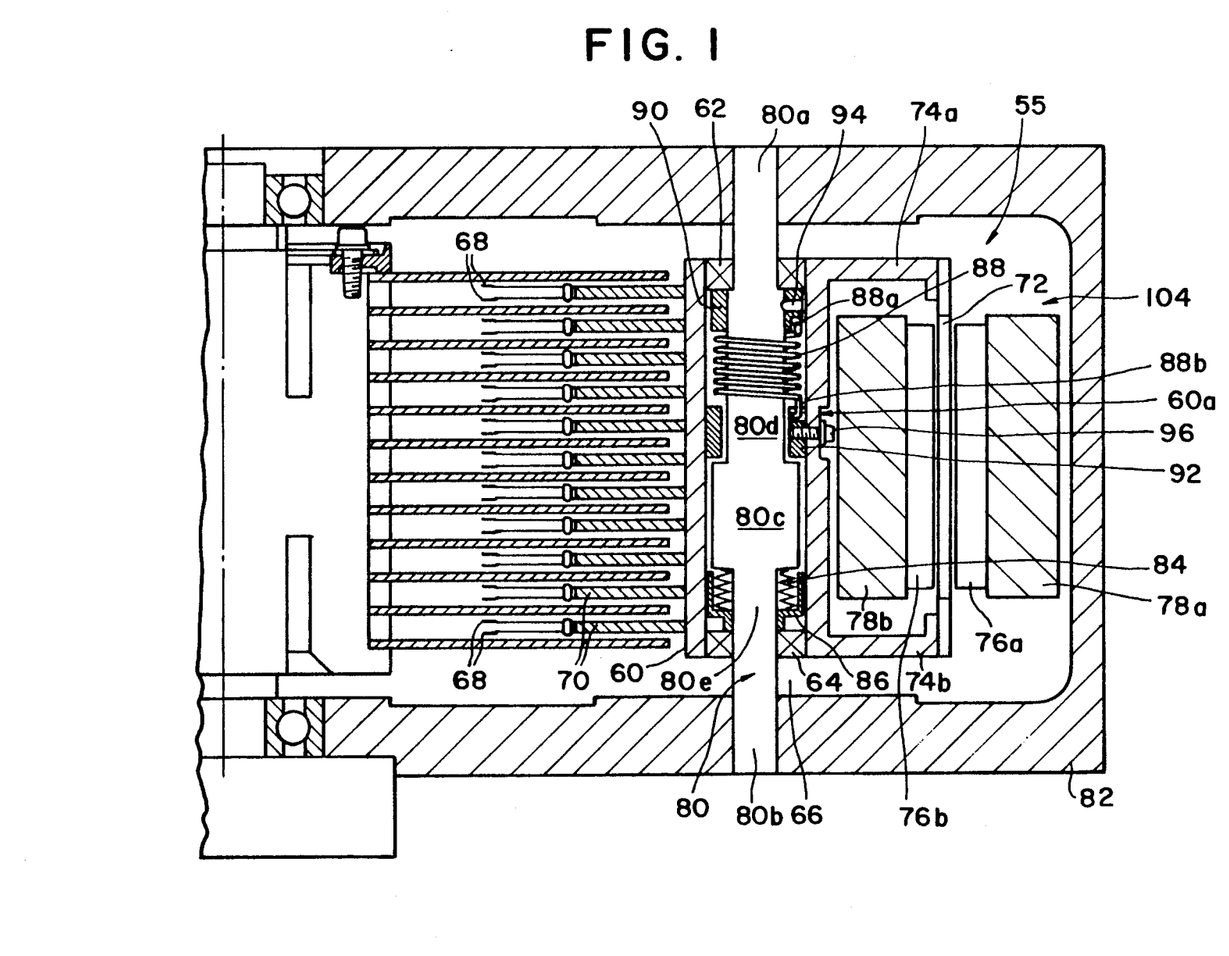
FIG. 1 is a schematic, vertical cross-sectional view of a preferred embodiment of a rotary actuator in accordance with the present invention.

FIG. 1 is a schematic, vertical cross-sectional view of the structure of a rotary actuator 55 using the present invention. The actuator 55 has a carriage 60 mounted to a center shaft 80 using bearings 62,64 so as to be rotatable about the center shaft 80. The carriage 60 has a hole 66 for insertion of the center shaft 80 therein, as will be further explained below. The actuator 55 also has a plurality of magnetic heads 68 held by corresponding head arms 70. The head arms 70 are mounted to the carriage 60 at predetermined intervals. A coil assembly 72 is mounted to the carriage 60 through supporting arms 74a,74b. The coil assembly 72 is located in between permanent magnets 76a,76b through an air space. The permanent magnets 76a,76b are respectively fixed to yokes 78a,78b which are mounted on a disk enclosure or housing 82 through a holding member (not illustrated in FIG. 1). A magnetic circuit 104 thus comprises the coil assembly 72, the permanent magnets 76a,76b and the yokes 78a,78b as will be explained in more detail below.

The center shaft 80 is fixed to the disk enclosure 82 so as not to be rotatable. The center shaft 80, therefore, is a stationary shaft fixed to the disk enclosure 82 at both ends 80a,80b of the center shaft 80. The center shaft 80 has an intermediate portion 80c which is diametrically larger than the shaft ends 80a,80b. A thrust pre-pressure spring 84 is arranged at a shaft portion 80e between the lower side of the larger diameter portion 80c of the center shaft 80 and the bearing 64.

One end of the thrust pre-pressure spring 84 contacts the larger diameter portion 80c, and the other end of spring 84 is held against the bearing 64 through a spring holder 86. The thrust pre-pressure spring 84, as embodied herein, comprises six coil springs surrounding the center shaft 80, each coil spring being held in the holder 86.

A coil return spring 88 is arranged on a portion 80d of the center shaft 80 formed between the shaft end 80a and the larger diameter portion 80c. Portion 80d has a smaller diameter than portion 80c. Preferably, the coil spring 88 is made of a stainless steel (e.g., SUS304WPB). A first end portion 88a of the coil spring 88 is fixed to a ring member 90, and another second end portion 88b of the spring 88 is fixed to a ring member 92.

The ring member 90 is fixed to the center shaft 80 by a set screw 94. The ring member 92 is fixed to the carriage 60 by fastening means, such as a screw 96.

In this structure of the rotary actuator, when direct current is supplied to the coil assembly 72, the carriage 60 rotates about the fixed center shaft 80. The coil spring 88, therefore, is pressure biased to create a returning force for the carriage 60. Thus, even when there is a breakdown or failure of a power supply for a seeking operation or read/write operation of the magnetic disk apparatus, the carriage 60 with the magnetic heads 68 are returned by the returning force of the coil spring 88 to a predetermined position, e.g., the CSS zone.

In this embodiment of the rotary actuator, and as will now be explained, the coil spring 88 is located so as not to contact with the outer surface of the center shaft 80 and inner surface of the carriage hole 66. The inside diameter of the ring member 90 is about the same as the diameter of the smaller diameter portion 80d, while the outer diameter of the ring member 90 is smaller than the inside diameter of the hole 66 of the carriage 60. Furthermore, the top surface of set screw 94 does not project from the outer surface of the ring member 90. On the other hand, the inside diameter of the ring member 92 is larger than the diameter of the smaller diameter portion 80d of the center shaft 80 and the inside diameter of the ring member 92 is about the same as the inside diameter of the hole 66 of the carriage 60. A screw 96 is located in a recess 60a of the carriage 60 so as not to make contact with the yoke 78b. For example, when the inside diameter of the ring member 90 is 12 mm, the outer diameter thereof is 19 mm. The outer diameter of the ring member 92 is 20 mm, and the inside diameter thereof is 13 mm. The thickness of each ring member 90 and 92 in relation to the longitudinal direction of the center shaft 80 is 6 mm. The inside diameter of the hole 66 is 20 mm. The diameter of the smaller diameter portion 80c of the center shaft 80 is 12 mm and the diameter of the larger diameter portion 80d thereof is 17 mm.

Therefore, when the carriage 60 rotates about the center shaft 80, the ring member 90 and the carriage 60, the center shaft 80 and the coil spring 88, and the ring member 92 and the center shaft 80, are not in contact with each other. If the coil spring 88 becomes in contact with the center shaft 80 or the carriage 60, a vibration could be caused by frictional resistance therebetween. This vibration could affect a seeking operation of the magnetic heads 68 and also could create undesirable dust. However, in this rotary actuator, such a problem does not arise because of the structure as explained above.

Yet a further significant advantage of this rotary actuator is the fact that the coil return spring 88 is arranged between bearings 62, 64. Therefore, the rotary actuator 55 can be made a short length in the longitudinal direction thereof.

Figure 2:
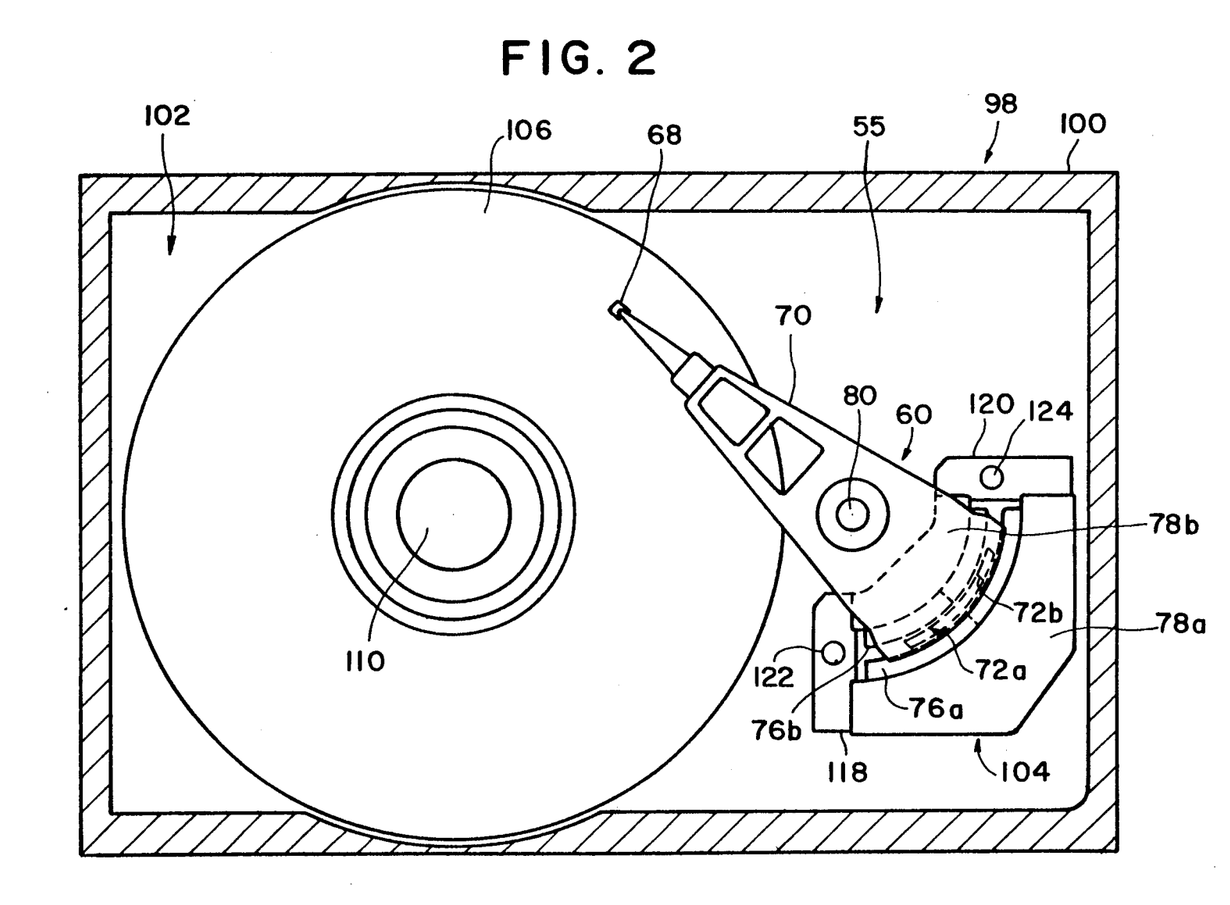
FIG. 2 is a schematic top plan view of a preferred embodiment of a magnetic disk apparatus with a rotary actuator in accordance with the present invention.
Figure 3:
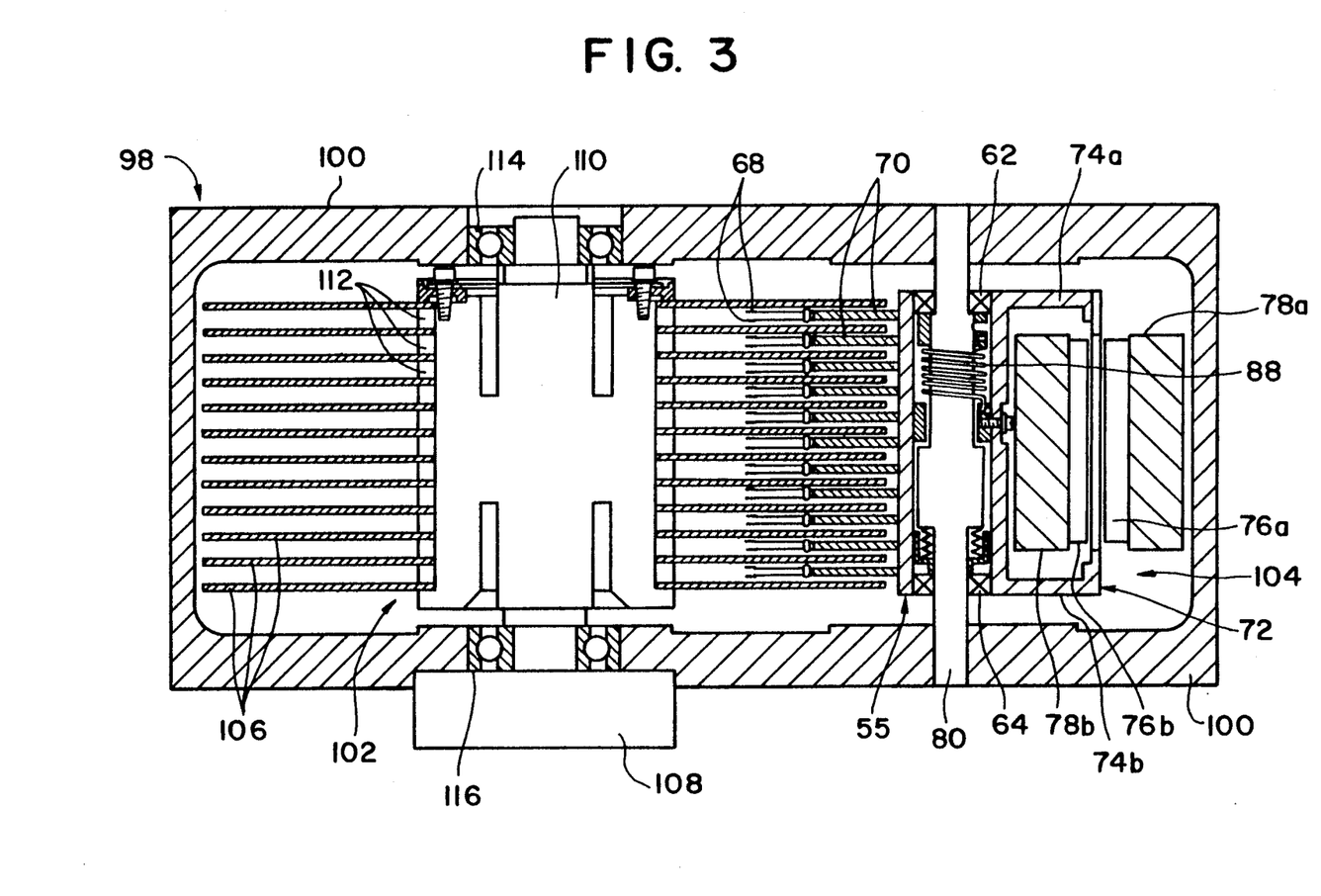
FIG. 3 is a schematic, vertical cross-sectional view of a magnetic disk apparatus with the embodiment of the rotary actuator of FIG. 1 in accordance with the present invention.

FIG. 2 is a schematic, top plan view and FIG. 3 is a schematic, vertical cross-sectional view illustrating a magnetic disk apparatus in accordance with an embodiment of the present invention.

As shown in FIGS. 2 and 3, a magnetic disk apparatus 98 comprises a disk enclosure or housing 100, a spindle assembly 102, rotary actuator 55, and a magnetic circuit 104. The spindle assembly 102 comprises a plurality of magnetic disks 106, a spindle motor 108, and a spindle shaft 110. The magnetic disks 106 are mounted on the spindle shaft 110 through spacers 112 located between the magnetic disks 106. The spindle shaft 110 is supported by the disk enclosure 100 through bearings 114, 116. Bearings 114, 116 are used to rotatably mount the ends of the spindle shaft 110. The spindle shaft 110 is driven and rotated by the spindle motor 108.

The magnetic circuit 104 comprises the coil assembly 72, the permanent magnets 76a, 76b, and the yokes 78a, 78b. As best seen from FIG. 2, the permanent magnets 76a, 76b respectively have a concave surface and a convex surface facing each other. The yoke 78a has a concave surface, and the opposing convex surface of the permanent magnet 76a is fixed to the concave surface of the yoke 78a. On the other hand, the yoke 78b has a convex surface, and the opposing concave surface of the permanent magnet 76b is fixed to the convex surface of the yoke 78b. The coil assembly 72 is a loop shape coil arranged between the concave surface of the permanent magnet 76a and the convex surface of the permanent magnet 76b. At a portion 72a of the coil assembly 72, a current flows from top to bottom, while on the other hand, at a portion 72b of the coil assembly 72, the current flows from bottom to top. Each of the permanent magnets 76a, 76b comprises a two-piece permanent magnet which is divided at the center of each of the permanent magnets 76a, 76b. The magnetic characteristics are different between the surfaces of each piece of the permanent magnets 76a, 76b.

Side yokes 118, 120 are arranged to connect with the yokes 78a and 78b. The side yokes 118, 120 are supported on the yokes 78a, 78b. Restriction poles 112, 124 are mounted from both sides of the side yokes 118, 120 to be in contact with supporting arms 74a, 74b at both sides of the carriage 60. The carriage 60, therefore, is limited in rotational movement to the extent of the restriction poles 122, 124.

The center shaft 80 of the rotary actuator 55 is secured by the disk enclosure 100 so as to locate each magnetic head 68 opposite to a corresponding surface of the magnetic disks 106. The coil spring 88 is provided to bias the carriage 60 toward the spindle 110 of the spindle assembly 102 because, in this case, the CSS zone is located on an inner most surface of the magnetic disk 106.

In this structure for the magnetic disk apparatus, when driving current is supplied to the coil assembly 72 and the carriage 60 rotates about the center shaft 80, the coil spring 88 is biased to create a returning force. Therefore, even when there is a breakdown or failure of a power supply of the magnetic apparatus 98, the carriage 60 is returned by the returning force of the coil spring 88 and thereby the magnetic heads 68 are positioned to the CSS zone.

Needless to say, since the coil spring 88 is arranged between bearings 62, 64 of the rotary actuator 55, the overall height of the magnetic disk apparatus 98 becomes shorter. Thus, the magnetic disk apparatus 98 can be made more compact in size for a disk apparatus.

Next, in accordance with the invention, a method of assembling the rotary actuator shown in FIG. 1, will be explained. FIGS. 4(a), 4(b), 4(c) and 4(d) are diagrams for explaining the method of assembly and assembly sequence of the rotary actuator shown in FIG. 1.

Figure 4A:
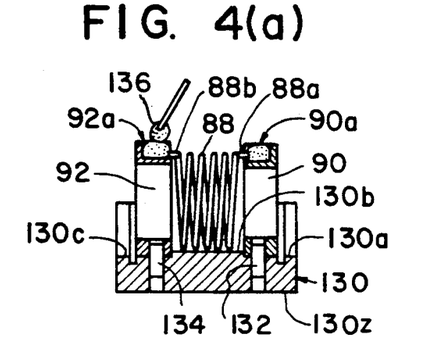
FIGS. 4(a), 4(b), 4(c) and 4(d) are diagrams for explaining the method of assembling the rotary actuator shown in FIG. 1.

As shown in FIG. 4(a), a jig member 130 is used and it has three surfaces 130a, 130b, 130c. The surface 130a is provided to locate the ring member 90, the surface 130b is used to locate the coil spring 88, and the surface 130c is provided to locate the ring member 92. As explained above, the diameter of the ring members 90, 92 and the coil spring 88 are different from each other. Thus, a reference surface 130z is used and the depths of each of the surfaces 130a, 130b, 130c of the jig member 130 are set from this reference surface 130z to be different from each other and therefore consistent with the different diameters thereof. This ensures that the center lines or axes of the ring members 90, 92 and the coil spring 88 are commonly aligned.

As shown in FIG. 4(a), in the first assembly step the ring members 90, 92 are placed on the surfaces 130a, 130c of the jig member 130 so as to match side surfaces of the ring members 90, 92 to steps formed in the jig member between the surface 130b and the surface 130a, and the surface 130b and the surface 130c. The ring members 90, 92 are then temporarily fixed by corresponding screws 132, 134 to the jig member 130. In this situation, each of recesses 90a, 92a of the ring members 90, 92 is located in a top position as shown in FIG. 4(a). The coil spring 88 is then placed on the surface 130b of the jig member 130 so as to have its end portions 88a, 88b inserted into the respective recesses 90a, 92a of the ring members 90, 92.

Then, the end portions 88a, 88b of the coil spring 88 are respectively fixed into the recesses 90a, 92a of the ring members 90, 92 by a bonding agent 136, for example, an epoxy resin type agent. The bonding agent 136 is filled only within the recesses 90a, 92a, because projecting portions may contact an inside portion of the carriage. Dusts could be created inside of the magnetic disk apparatus 98 if the bonding agent 136 projected from the outer surfaces of the ring members 90, 92.

After the bonding agent 136 has dried, the screws 132, 134 are unfastened. Then, coil spring assembly 138, with the coil spring 88 and the ring member 90, 92 integrally assembled to each other, is removed from the jig member 130.

Figure 4B:
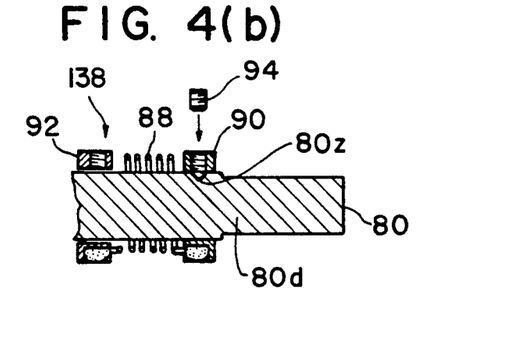

Next, as shown in FIG. 4(b), coil spring assembly 138 is inserted over the center shaft 80, and the ring member 90 is fixed to the center shaft 80 by set screw 94. To ensure proper mating, recess 80z is formed in the smaller diameter portion 80d of the center shaft 80 for engaging the end of set screw 94. A set screw 94 is used since the top portion of the set screw 94 does not project from the surface of the ring member 90 and thus does not interfere with the inner surface of the carriage hole 66. Furthermore, the set screw 94 is fastened to the same female screw to which the screw 132 is fastened for engaging the jig member 130.

Figure 4C:
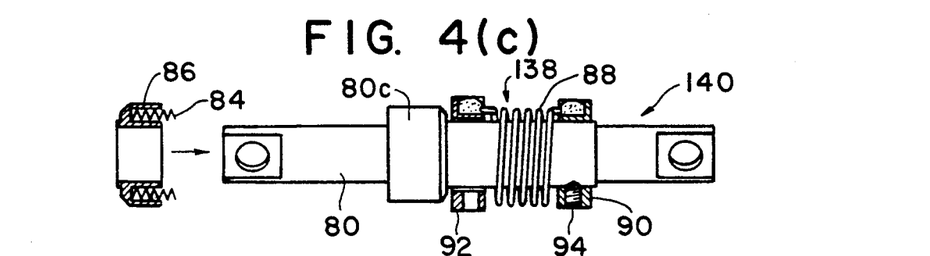

Next, as shown in FIG. 4(c), the holder 86 for holding the thrust pre-pressure spring 84 is inserted onto the other end of the center shaft 80 from the larger diameter portion 80c, i.e., on the reverse side from the coil spring assembly 138. A center shaft assembly 140 is now completely made up.

Figure 4D:
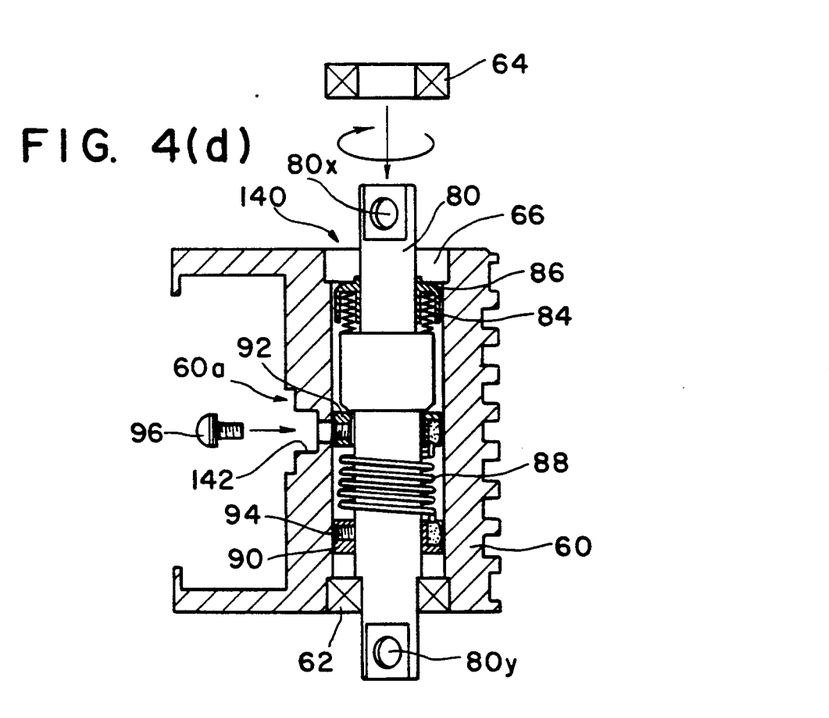

Finally, as shown in FIG. 4(d), the center shaft assembly 140 is inserted into the hole 66 of the carriage 60 with one end of assembly 140 mounted through the bearing 62. Bearing 62 has already been mounted at an end of the hole 66 of the carriage 60. At this time, the center shaft assembly 140 is inserted so that a side threadable hole of the ring member 92 matches with a hole 142 provided at the recess 60a of the carriage 60. Then, the ring member 92 of the center shaft assembly 140 is fixed to the carriage 60 by a screw 96 being located in the threadable hole of the ring member 92. The other bearing 64 is mounted at the other end of the hole 66 of the carriage 60. After that, the magnetic heads 68 and the coil assembly 72 are fixed to the carriage 60, and thereby the rotary actuator is assembled.

In this rotary actuator 55 assembled as explained above, the carriage 60 can rotate about the center shaft 80 during a seeking operation of the magnetic heads 68 without the coil spring 88 contacting the center shaft 80 or the carriage 60. Therefore, the seeking operation of the magnetic heads 68 can be carried out correctly and dust is not created inside of the magnetic disk apparatus 98 during rotation of the carriage 60.

In this embodiment, if the bonding agent 136 is used to fix the end portions 88a, 88b of the coil spring 88, the end portions 88a, 88b do not have to be precisely bent. For example, if the fixing means for the spring were screws and the end portions 88a, 88b of the coil spring 88 were not bent exactly to fit the recesses 90a, 92a of the ring embers 90, 92, it would be difficult to fix the coil spring 88 and the ring members 90, 92 to be consistent or in alignment with their center axis. That is, the end portions 88a, 88b of the coil spring 88 can have distortions when the end portions 88a, 88b are being fixed to the ring members 90, 92 by a screw. However, where the bonding agent is used, the bonding agent can fill a gap between the end portions 88a, 88b of the coil spring 88 and the ring members 90, 92. Therefore, the end portions 88a, 88b of the coil spring 88 need not be bent exactly, and the end portions 88a, 88b do not have a distortion while the end portions 88a, 88b are fixed.

Figure 5:
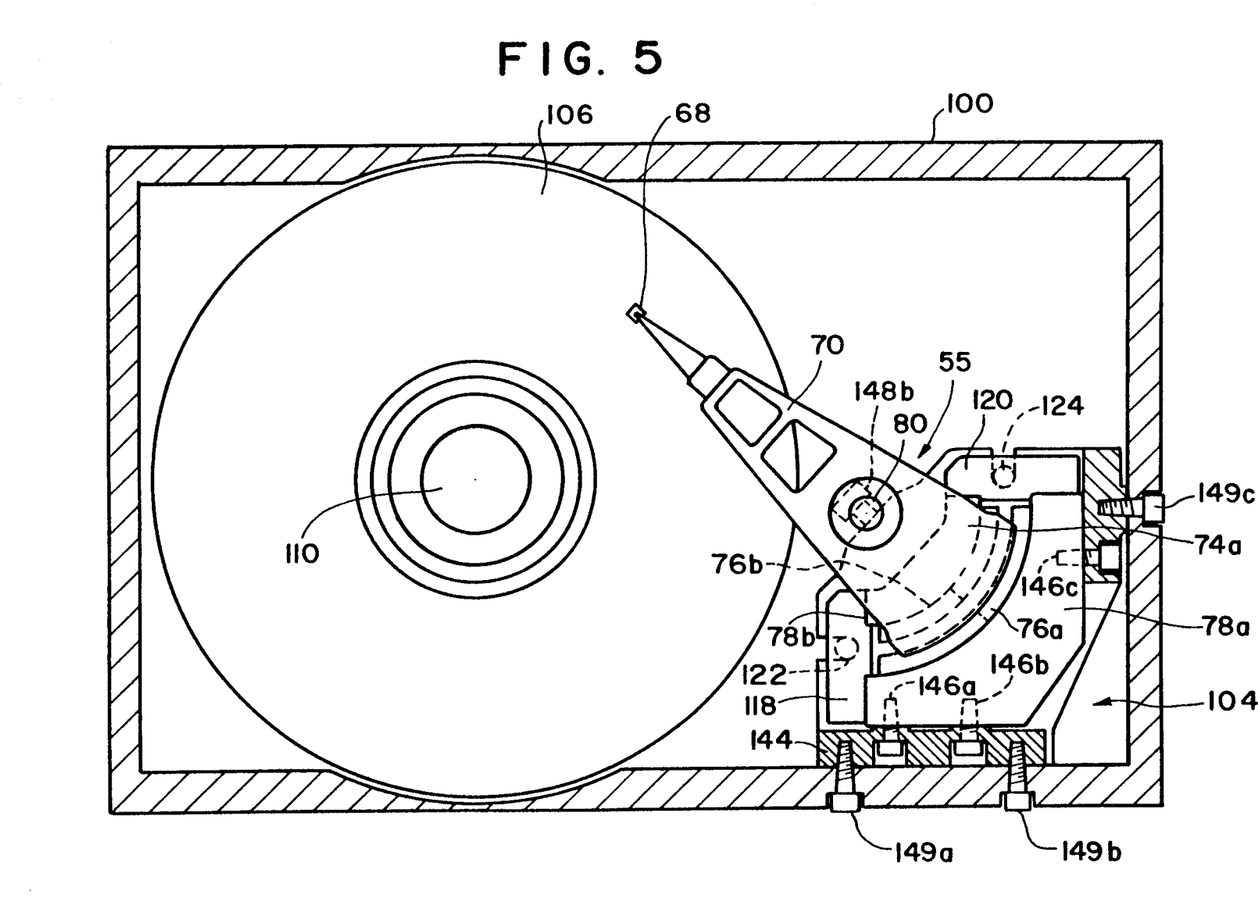
FIG. 5 is a schematic, top plan view illustrating a magnetic disk apparatus and the method of mounting a center shaft assembly for the rotary actuator in accordance with the present invention.
Figure 6:
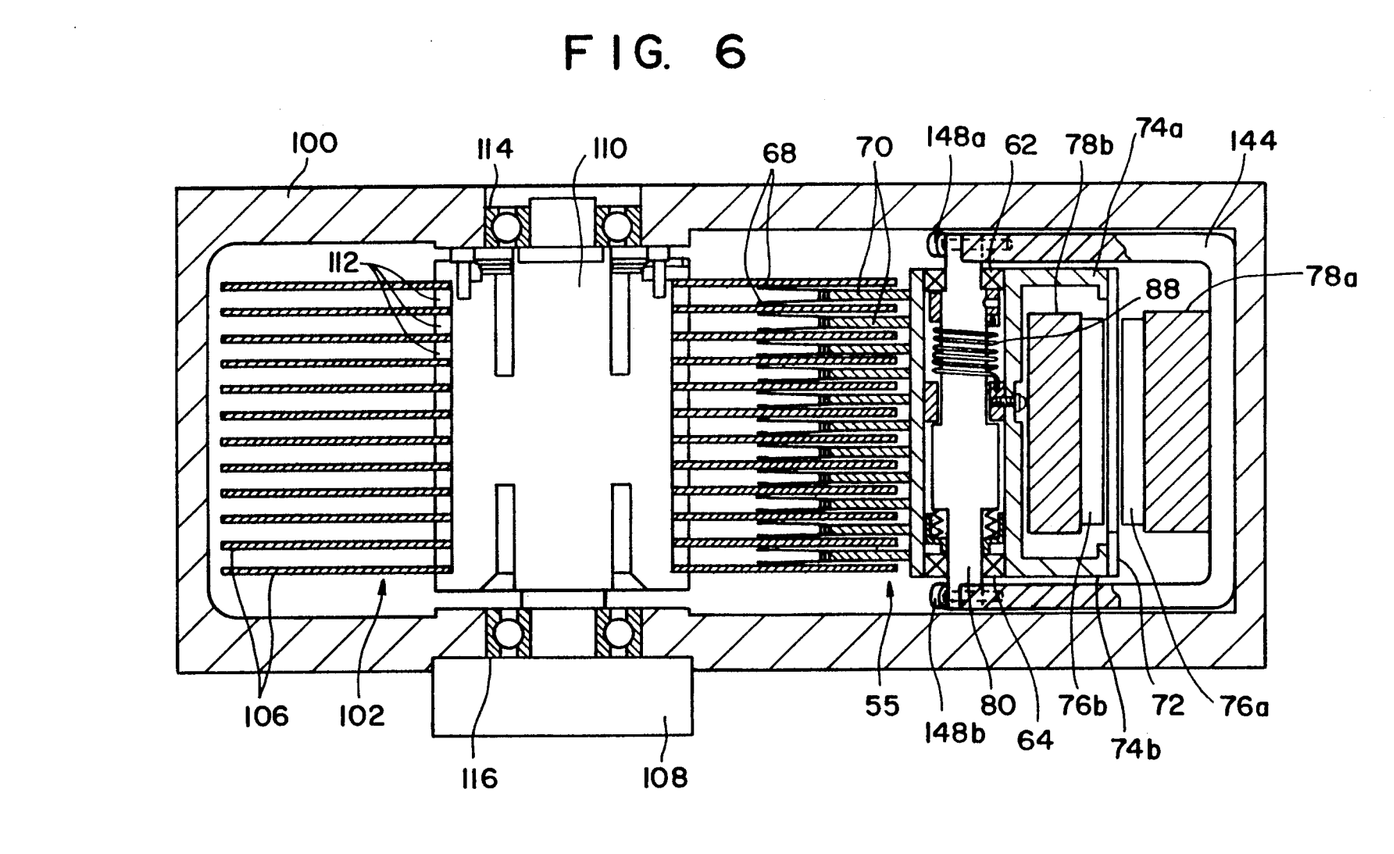
FIG. 6 is a schematic, vertical cross-sectional view illustrating a magnetic disk apparatus and the method of mounting the center shaft assembly for the rotary actuator in accordance with the present invention.

Next, the method of mounting the center shaft assembly of the rotary actuator to the disk apparatus will be explained below with reference to FIGS. 5 and 6. FIG. 6 is a schematic top plan view and FIG. 6 is a schematic, vertical cross-sectional view illustrating a magnetic disk apparatus and the method of mounting the center shaft assembly of a rotary actuator to the disk apparatus.

In the first step, the magnetic circuit 104, which includes the permanent magnets 76a, 76b, the yokes 78a, 78b, and the side yokes 118, 120, is fixed to a holding or mounting member 144. This is accomplished by connecting the yoke 78a to the mounting member 144 using screws 146a, 146b, 146c. The restriction pole 122 is also fixed to the holding member 144 by screws not illustrated in FIGS. 5 and 6. After the side yoke 120 is temporarily removed from the magnetic circuit 104, the rotary actuator 55 is fixed to the holding member 144 at both ends of the center shaft 80 by screws 148a, 148b through corresponding holes 80y, 80x of the center shaft 80. At that time, the coil assembly 72 has not yet been located between the permanent magnets 76a, 76b, because the coil spring 88 is not biased by anything. Then, the carriage 60 is rotated, and the coils 72a, 72b are inserted between the permanent magnets 76a, 76b and the returning force is held with the coil spring 88. Next, the restriction pole 124 is fixed to the holding member 144 by screws not illustrated in FIGS. 5 and 6. After that, the side yoke 120 is fixed to the yokes 78a, 78b by screws or by the magnetic attracting force of the permanent magnets 76a, 76b. Finally, the holding member 144 is fixed to the disk enclosure 100 by screws 149a, 149b, 149c.

It can be seem from the foregoing description of the preferred embodiments of the invention, that a compact magnetic disk apparatus can be achieved and that this compact design can be realized without an increase of deflection of the carriage during operation of the disk apparatus. Further, this compact magnetic disk apparatus can be provided without interference with the seek operation or read/write operation of the magnetic heads due to the lack of contact between the spring and the center shaft, as well as between the spring and the carriage. Other advantages and modifications will become known to those skilled in the art from the above description.

Thus, it is intended that the present invention cover the modifications and variations in the actuator, disk apparatus, and method of assembly for same, in accordance with the invention within the scope of the appended claims and their equivalents and without limitation to different environments.

What is claimed is:

1. A rotary actuator to move a reading and/or writing head onto a disk comprising:
   (a) a center shaft;
   (b) a carriage positioned around said center shaft, said carriage supporting the reading and/or writing head at an outer side of said carriage;
   (c) a bearing for rotatably mounting said carriage to said center shaft; and
   (d) a return spring, provided in a space formed between said center shaft and said carriage, biasing said carriage against said center shaft in a rotational direction about said center shaft, a first end of said return spring being fixed to said center shaft and a second end of said return spring being fixed to said carriage at an inner side of said carriage.

2. A rotary actuator as recited in claim 1, wherein said return spring is a coil spring having an inside diameter larger than an outer diameter of the center shaft and said carriage having a hole with an inside diameter larger than an outer diameter of the coil spring.

3. A rotary actuator as recited in claim 2, further comprising:
   first and second ring members,
   wherein said first ring member is fixed to said carriage and has an inside diameter larger than the diameter of said center shaft and said second ring member is fixed to the center shaft and has an inside diameter the same as the diameter of said center shaft, and
   wherein a first end of said coil spring is fixed to said first ring member and a second end of said coil spring is fixed to said second ring member.

4. A rotary actuator as recited in claim 3, wherein said first and second ring members have recesses and the ends of said coil springs are inserted into the respective recesses of the first and second ring members.

5. A rotary actuator as recited in claim 4, wherein each end of said coil spring is fixed in the respective recess of said corresponding ring members by a bonding agent.

6. A rotary actuator as recited in claim 3, wherein said carriage has a side through hole and said first ring member is fixed to said carriage by a screw through said side through hole.

7. A rotary actuator as recited in claim 3, wherein said second ring member is fixed to said center shaft by a set screw.

8. A rotary actuator as recited in claim 1, wherein said bearing comprises a pair of bearings arranged at ends of said carriage between said carriage and said center shaft, and said return spring is a coil spring located around the center shaft between said pair of bearings.

9. A rotary actuator as recited in claim 8, further comprising:

a first ring member fixed to said carriage,
wherein said center shaft has a larger diameter portion which is greater than the inside diameter of said first ring member and less than the inside diameter of said carriage.

10. A rotary actuator to move a reading and/or writing head onto a disk comprising:
   (a) a center shaft having a larger diameter portion;
   (b) a carriage positioned around said center shaft, said carriage supporting the reading and/or writing head, the larger diameter portion of said center shaft being less than the inside diameter of said carriage;
   (c) a pair of bearings for rotatably mounting said carriage to said center shaft, said pair of bearings being arranged at an end of said carriage between said carriage and said center shaft;
   (d) a coil return spring located around said center shaft between said pair of bearings and provided in a space formed between said center shaft and said carriage to bias said carriage in a rotational direction;
   (e) a first ring member fixed to said carriage and having an inside diameter less than the larger diameter portion of said center shaft; and
   (f) a spring to axially bias said center shaft toward said bearings by pressing against the larger diameter portion of said center shaft.

11. A rotary actuator to move a magnetic head onto a magnetic disk comprising:
   (a) a shaft;
   (b) a carriage for supporting the magnetic head and having a longitudinal hole for positioning said carriage around said shaft;
   (c) a bearing for rotatably supporting said carriage about said shaft;
   (d) a coil spring, provided around the shaft and in a space formed between said shaft and said carriage, for biasing said carriage against said shaft in a rotational direction about said shaft;
   (e) a first ring member fixed to said shaft, said first ring member supporting one end of said coil spring; and
   (f) a second ring member fixed to said carriage in the longitudinal hole of said carriage, said second ring member supporting another end of said coil spring.

12. A rotary actuator as recited in claim 11, wherein said coil spring having an inside diameter larger than an outside diameter of said shaft and an outside diameter less than an inside diameter of said carriage.

13. A rotary actuator as recited in claim 12, wherein said first ring member has an inside diameter the same as the diameter of said shaft and an outside diameter less than an inside diameter of said carriage, and said second ring member has an inside diameter greater than the diameter of said shaft and an outside diameter the same as the inside diameter of said carriage, and wherein an end of said coil spring is fixed to said first ring member and another end of said coil spring is fixed to said second ring member.

14. A rotary actuator as recited in claim 13, wherein said first and second ring members have a recess, and each end of said coil spring is inserted into a respective recess of the corresponding ring member.

15. A rotary actuator as recited in claim 14, wherein the ends of said coil springs are fixed in the recesses of said first and second ring members by a bonding agent.

16. A rotary actuator as recited in claim 13, wherein said carriage has a side through hole and said second ring member is fixed to said carriage by a screw through the side through hole.

17. A rotary actuator as recited in claim 11, wherein said first ring member is fixed to said shaft by a set screw.

18. A rotary actuator as recited in claim 11, wherein said bearing comprises a pair of bearings arranged at ends of said carriage, and said coil spring is located around said shaft between said pair of bearings.

19. A rotary actuator as recited in claim 18, wherein said shaft has a larger diameter portion which is greater than the inside diameter of said first ring member and less than the inside diameter of said carriage.

20. A rotary actuator to move a magnetic head onto a magnetic disk, comprising:
   (a) a shaft having a larger diameter portion;
   (b) a carriage for supporting the magnetic head and having a longitudinal hole for positioning said carriage around said shaft;
   (c) a pair of bearings arranged at ends of said carriage for rotatably supporting said carriage about said shaft;
   (d) a coil spring, located around said shaft between said pair of bearings and in a space formed between said shaft and said carriage, for biasing said carriage in a rotational direction;
   (e) a first ring member fixed to said shaft, said first ring member supporting one end of said coil spring, said larger diameter portion of said shaft being greater than the inside diameter of said first ring member and less than the inside diameter of said carriage;
   (f) a second ring member fixed to said carriage, said second ring member supporting another end of said coil spring; and
   (g) a spring to axially bias said shaft toward said bearings by pressing against the larger diameter portion of said shaft.

21. A disk apparatus comprising:
   (a) a reading and/or writing head;
   (b) a disk having a recording zone for recorded data and a positioning zone for positioning said head when said reading and/or writing head is not in a reading and/or writing operation;
   (c) a shaft fixed to a case covering said head and said disk;
   (d) a carriage positioned around said center shaft, said carriage supporting the reading and/or writing head at an outer side of said carriage;
   (e) a bearing for rotatably mounting said carriage to said shaft;
   (f) a magnetic circuit for operatively rotating said carriage about said shaft, thereby moving said head onto said disk; and
   (g) a coil spring, provided around said shaft and in a space formed between said shaft and said carriage, a first end of said return spring being fixed to said shaft and a second end of said return spring being fixed to said carriage at an inner side of said carriage, said coil spring biasing said carriage and said head mounted thereon against said shaft in a rotational direction about said shaft to move into the positioning zone of said disk.

22. A disk apparatus as recited in claim 21, further comprising:
   a first ring member fixed to said shaft, said first ring member supporting a first end of said coil spring; and
   a second ring member fixed to said carriage, said second ring member supporting a second end of said coil spring.

23. A disk apparatus as recited in claim 22, wherein said coil spring has an inside diameter greater than the diameter of said shaft and said carriage has an inside diameter greater than an outside diameter of said coil spring.

24. A disk apparatus as recited in claim 23, wherein said first ring member has an inside diameter the same as the diameter of said shaft, and said second ring member has an inside diameter greater than the diameter of said shaft, and
   wherein an end of said coil spring is fixed to said first ring member and another end of said coil spring is fixed to said second ring member.

25. A disk apparatus as recited in claim 24, wherein said first and second ring members have recesses, and each end of said coil spring is inserted into a respective recess of the corresponding ring member.

26. A disk apparatus as recited in claim 25, wherein the ends of said coil spring are fixed in the recesses of said first and second ring member by a bonding agent.

27. A disk apparatus as recited in claim 22, wherein said carriage has a side through hole and said second ring member is fixed to said carriage by a screw through said side through hole.

28. A disk apparatus as recited in claim 22, wherein said first ring member is fixed to said shaft by a set screw.

29. A disk apparatus as recited in claim 22, wherein said bearing comprises a pair of bearing arranged at ends of said carriage, and said coil spring is located around said shaft between said pair of bearings.

30. A disk apparatus as recited in claim 29, wherein said shaft has a larger diameter portion which is greater than the inside diameter of said first ring member and less than the inside diameter of said carriage.

31. A disk apparatus comprising:
   (a) a reading and/or writing head;
   (b) a disk having a recording zone for recorded data and a positioning zone for positioning said head when said reading and/or writing head is not in a reading and/or writing operation;
   (c) a shaft having a larger diameter portion, said shaft being fixed to a case covering said head and said disk;
   (d) a carriage positioned around said shaft, said carriage supporting the reading and/or writing head;
   (e) a pair of bearings arranged at ends of said carriage for rotatably mounting said carriage to said shaft;
   (f) a magnetic circuit for operatively rotating said carriage about said shaft, thereby moving said head onto said disk;
   (g) a coil spring located around said shaft between said pair of bearings and in a space formed between said shaft and said carriage, said coil spring biasing said carriage and said head mounted thereon into the positioning zone of said disk;
   (h) a first ring member fixed to said shaft, said first ring member supporting a first end of said coil spring, the larger diameter portion of said shaft being greater than the inside diameter of said first ring member and less than the inside diameter of said carriage;
   (i) a second ring member fixed to said carriage, said second ring member supporting a second end of said coil spring; and
   (j) a spring to axially bias said shaft toward said bearings by pressing against the larger diameter portion of said shaft.

* * * * *